United States Patent [19]
Parks et al.

[11] Patent Number: 5,025,396
[45] Date of Patent: Jun. 18, 1991

[54] METHOD AND APPARATUS FOR MERGING A DIGITIZED IMAGE WITH AN ALPHANUMERIC CHARACTER STRING

[75] Inventors: Carol A. Parks, Monrovia, Md.; Robert E. Probst, Reston, Va.; Doraiswamy Rajagopal, Rockville; Gary L. Youngs, Gaithersburg, both of Md.

[73] Assignee: International Business Machines Corporation, Armonk, N.Y.

[21] Appl. No.: 326,338

[22] Filed: Mar. 21, 1989

[51] Int. Cl.$^5$ ............................................. G06F 11/10
[52] U.S. Cl. ..................................... 364/518; 364/521; 340/723; 340/750
[58] Field of Search ........................ 364/518, 521, 522; 340/723, 747, 750, 798, 799; 382/46, 56

[56] References Cited

U.S. PATENT DOCUMENTS

| | | | |
|---|---|---|---|
| 4,552,206 | 11/1985 | Smutek et al. | 364/300 |
| 4,587,633 | 5/1986 | Wang et al. | 364/900 |
| 4,803,476 | 2/1989 | Knapton et al. | 340/750 |
| 4,814,756 | 3/1989 | Chauvel | 340/750 |
| 4,835,529 | 5/1989 | Ishii | 340/721 |
| 4,847,785 | 7/1989 | Stephens | 364/518 |
| 4,862,386 | 8/1989 | Axelrod et al. | 364/518 |
| 4,885,699 | 12/1989 | Taoda et al. | 364/518 |
| 4,914,607 | 4/1990 | Takanashi et al. | 364/521 |
| 4,933,880 | 6/1990 | Bongendale et al. | 364/523 |

Primary Examiner—Gary V. Harkcom
Assistant Examiner—Phu K. Nguyen
Attorney, Agent, or Firm—John E. Hoel

[57] ABSTRACT

The method merges an alphanumeric data stream with a digitized image file. It comprises the steps of inputting a digitized image file in a first input terminal and storing the digitized image file on a first storage medium. The method then inputs an alphanumeric character string in a second input mechanism and stores the alphanumeric character string in a second storage medium. The method then converts the alphanumeric character string stored in the second storage medium into a bit pel image of the alphanumeric character string by substituting a two dimensional bit pattern of pels for each respective character in the string. The method then performs a logical combination of the bit pattern for each respective alphanumeric character with the digitized image at respective intended character locations in the digitized image area and outputs the logically combined digitized image with the alphanumeric character string superimposed thereon.

8 Claims, 7 Drawing Sheets

CREATING THE FORM:

```
DRAW A FORM IN A MEDIUM WHICH INCLUDES A PLURALITY OF BLANKS
                            ↓
CAPTURE A DIGITIZED IMAGE OF THE FORM AS A FORM IMAGE FILE
                            ↓
STORE FORM IMAGE FILE UNDER A FIRST FILE NAME
                            ↓
DEFINE FORMAT DATA SET WITH NAME AND LOCATION OF EACH
BLANK REGION AND ASSOCIATE IT WITH THE FIRST FILE NAME
                            ↓
STORE THE FORMAT DATA SET UNDER A SECOND FILE NAME
```

FILLING IN FORM:

```
ACCESS THE FORMAT DATA SET
                            ↓
INPUT AN ALPHANUMERIC STRING TO BE INSERTED INTO
ONE OF THE BLANKS
                            ↓
ASSEMBLE CUSTOM DATA SET
                            ↓
STORE CUSTOM DATA SET
```

DISPLAY FILLED-IN FORM:

```
ACCESS CUSTOM DATA SET
                            ↓
EXTRACT THE FIRST FILE NAME FROM THE CUSTOM DATA SET
                            ↓
ACCESS THE FORM IMAGE FILE USING THE FIRST FILE NAME
                            ↓
CONVERT THE ALPHANUMERIC STRING INTO THE PEL BIT SHAPES
OF THE CHARACTERS REPRESENTED BY THE STRING IN THE
CUSTOM DATA SET
                            ↓
MERGE THE PEL BIT SHAPES OF THE CHARACTERS WITH THE FORM
IMAGE FILE AT THE LOCATION OF THE BLANK SPECIFIED IN THE
CUSTOM DATA SET
                            ↓
DISPLAY OR PRINT FILLED-IN FORM
```

```
    0 1 2 3 4 5 6 7
 0
 1    .       .
 2    .       .
 3    .       .
 4    .       .
 5    .       .
 6    .       .
 7    .       .
 8    .       .
 9    ..
10    ..         BASELINE POSITION - 12 PITCH FONT
11    .    ─────────────────────────────────────
12    .
13    .
14    .
15
```

```
    0 1 2 3 4 5 6 7 8 9
 0
 1    .           .
 2    .           .
 3    .           .
 4    .           .
 5    .           .
 6    .           .
 7    .           .
 8     .        .
 9     ..
10      ..        BASELINE POSITION - 10 PITCH FONT
11
```

FIG. 10

```
                    COLUMN NUMBERS
      1 2 3 4 5 6 7 8 9 10 11 12 13 14 15 16 17 18 19 20 21 22 23 24 25 26 27 28 29 30 31 32 33

1
 2
 3
 4
 5
 6              A B Z   I N S U R A N C E   C O .
 7                      A P P L I C A T I O N
 8
 9
10
11    C U S T O M E R            | J O H N   D O E            |
12    N A M E
13
14
15
16    C U S T O M E R            | 1 2 3   B A K E R   S T.   |
17    A D D R E S S
18
19
20    P O L I C Y                         | 2 3 1 9 8 |
21    N U M B E R
22
23
24

ROW
NUMBERS
```

METHOD AND APPARATUS FOR MERGING A DIGITIZED IMAGE WITH AN ALPHANUMERIC CHARACTER STRING

DESCRIPTION

BACKGROUND OF THE INVENTION

1. Technical Field

The invention disclosed broadly relates to data processing methods and apparatus and more particularly relates to the merger of digitized images with alphanumeric character strings in a data processing system.

2. Background Art

An example of a system for storing and manipulating digitized images is provided in the copending patent application by C. A. Parks, et al. entitled "Dual Density Digital Image System," Ser. No. 211,646, filed June 27, 1988, assigned to the IBM Corporation and incorporated herein by reference and the copending patent application by C. A. Parks, et al. entitled "Object Management and Delivery System Having Multiple Object Resolution Capability," Ser. No. 211,722, filed June 27, 1988, assigned to the IBM Corporation and incorporated herein by reference. These two patent applications describe an example digital image archiving system within which the invention described herein finds application. In the prior art, if a user of a digital image archiving system wished to enter a form into the system which had been filled out, for example an application for automobile insurance wherein the applicant's name and home address, etc. are filled in on a form, the user would have to print out the applicant's customized data onto a preprinted form and then optically scan that filled-in form using an optical scanner. The resultant digitized image would then be entered into the image archiving system. This approach is not efficient in the use of operator time nor is it efficient in the use of materials such as preprinted forms. The prior art has not found an adequate solution for problems such as this.

OBJECTS OF THE INVENTION

It is therefore an object of the invention to provide an improved means for merging alphanumeric information with digitized images.

It is another object of the invention to provide an improved means for entering customized data onto a predefined form for entry in a digitized image archiving system.

It is still a further object of the invention to provide a means to process coded data along with digitized images in a digitized image archiving system.

It is yet a further object of the invention to provide a means for processing coded data along with digitized images so as to automatically merge the two for subsequent storage, display or printing.

SUMMARY OF THE INVENTION

These and other objects, features and advantages are accomplished by the invention disclosed herein. A method is disclosed for merging an alphanumeric data stream with a digitized image file comprising the steps of inputting a digitized image file in a first input terminal and storing the digitized image file on a first storage medium; inputting an alphanumeric character string in a second input mechanism and storing the alphanumeric character string in a second storage medium; converting the alphanumeric character string stored in the second storage medium into a bit pel image of the alphanumeric character string by substituting a two dimensional bit pattern of pels for each respective character in the string; performing a logical combination of the bit pattern for each respective alphanumeric character with the digitized image at respective intended character locations in the digitized image area; and outputting the logically combined digitized image with the alphanumeric character string superimposed thereon.

In a data processing system, a process is disclosed for preparing a form, comprising the steps of drawing a form in a medium, which includes a plurality of blank regions; capturing a digitized image of the form as a form image file in the data processing system; storing the form image file under a first file name in the data processing system; inputting name data and location data for each of the blank regions in the form and associating the first file name in a format data set; storing the format data set under a second file name in the data processing system. To fill in a form, the format data set is accessed and an alphanumeric string to be inserted into one of the blanks is input. Then the custom data set is assembled which includes the first file name, and customized data represented by the alphanumeric string. The custom data set is then stored. One of the features of the invention is that the plurality of custom data sets can be stored, each having a small storage area and each corresponding to a single form image file which occupies a much larger portion of storage. To display a filled-in form, the custom data set is accessed and from it the first file name is extracted. Then, the form image file can be accessed using the first file name. The alphanumeric strings in the custom data set are then converted into pel bit shapes of the characters represented by the string. Then, the pel bit shapes of the characters can be merged with the form image file at the location of the blanks specified in the custom data set. Finally, the resulting filled-in form can be displayed or printed.

BRIEF DESCRIPTION OF THE DRAWINGS

These and other objects, features and advantages of the invention can be more fully appreciated with reference to the accompanying Figures.

DESCRIPTION OF THE BEST MODE FOR CARRYING OUT THE INVENTION

This invention describes a means to process coded data along with image in Image System as described by the patent applications by C. A. Parks, et al. referenced above and the ability to process either in the workstation, with the additional capability of automatically merging the two on the display or printer bit plane if they have been logically related through record header information.

The Coded Data Storage Processor is a software component designed to facilitate the storage of coded data (non-image records) into the IBM Image System MVS/ESA folder structure as discussed in the C. A. Parks, et al. patent applications cited above; thereby allowing coded data as well as images to be securely stored, managed and processed through the, heretofore, image only processing features of that system.

Internal processing features of the Image System MVS/ESA are such that it has the capability of processing either images or coded data throughout the system. The object workstations have the additional capability of merging the coded data with a pre-identified image overlay for a composite presentation on the workstation display or the workstation printer. These features allow the storage of coded data in non-image form (EBCDIC - Extended Binary Coded Decimal Interchange Code), thereby greatly reducing the physical storage requirement, while allowing the automatic presentation of the coded data to be in an image-like format.

There is a relational (logical) collection of data that represents all the system information available about a certain entity such as a person or account or policy. This relational collection constitutes a folder of such an entity. Previous art provided either a standalone secure image (Write Once Read Multiple (WORM) technology) processing capability for a folder of image documents (images and/or coded data stored in image format) or individual or relational processing of various coded data for an entity, but did not provide an integrated processing combination of the two, each stored in its own format, in a single, secure (WORM technology) folder storage and retrieval system. Nor did previous art provide automatic merger capability of the two formats in the workstation. Prior art required direction from the workstation user through menu selection or other interactive means. This integration of image and coded data into the Image System MVS/ESA folder structure is facilitated by and is the essence of our invention.

As further explanation, much previous art has dealt with publishing systems that allow cut and paste or overlay of graphics, images and text (coded data) onto a page or book-like format. Each of these systems must have intimate knowledge of the structure detail of each data piece to accomplish their composition tasks. There is no integrated secure (WORM technology) storage capability for each of the pieces nor is there a concept of an integrated system folder consisting of all data (images, coded data) for an entity that can be stored, retrieved and displayed without user regard to some internal data structure characteristics.

Available system data for collection into a folder are generally not only scanned image data, but also coded data that enter the system through key entry, other non-image input system processing means or through system generation (computation). Coded data are normally stored on magnetic DASD or tape media that are created when the coded data are captured or generated by the computer system. Previous art allowed printouts of such data to be captured as images through a scanning process and to be included as image data in a folder.

Figure 1:
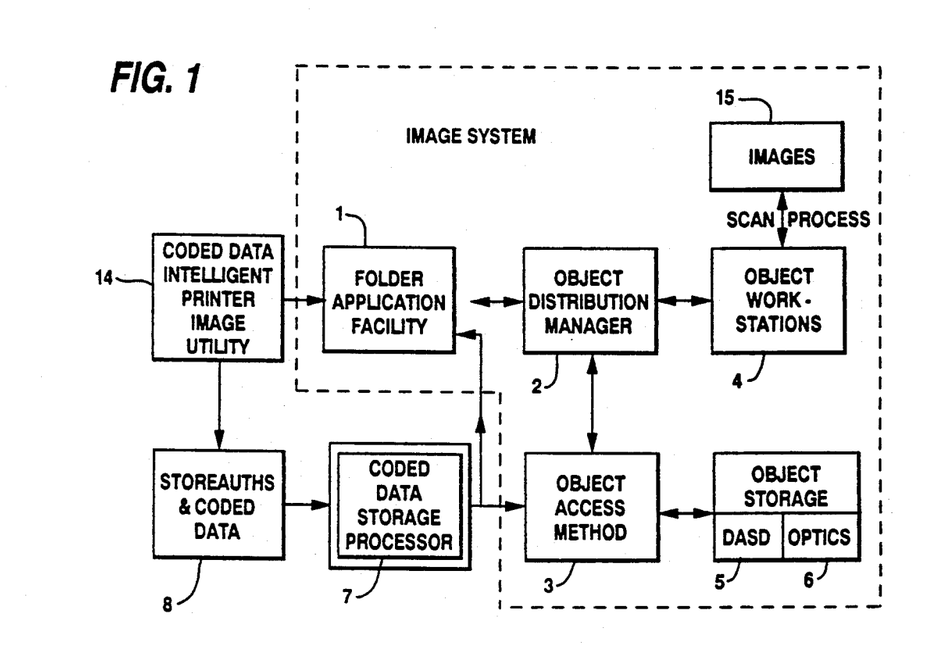
FIG. 1 is a functional block diagram of a digitized image archiving system which includes the coded data storage processor invention.

FIG. 1 depicts the components of the Image System MVS/ESA (1-6, 8, 14, 15) with the inclusion of this invention (7).

The Folder Application Facility (FAF) (1) maintains the logical relationship of images (15) and coded data (8) to a folder. The Object Distribution Manager (ODM) (2) routes requests for images and coded data processing throughout the Image System MVS/ESA. The Object Access Method (OAM) (3) manages the storage of images and coded data on DASD (5) and Optical Disk (6) using WORM technology. The Object Workstations (4) are used to display or print images and/or coded data.

Figure 2:
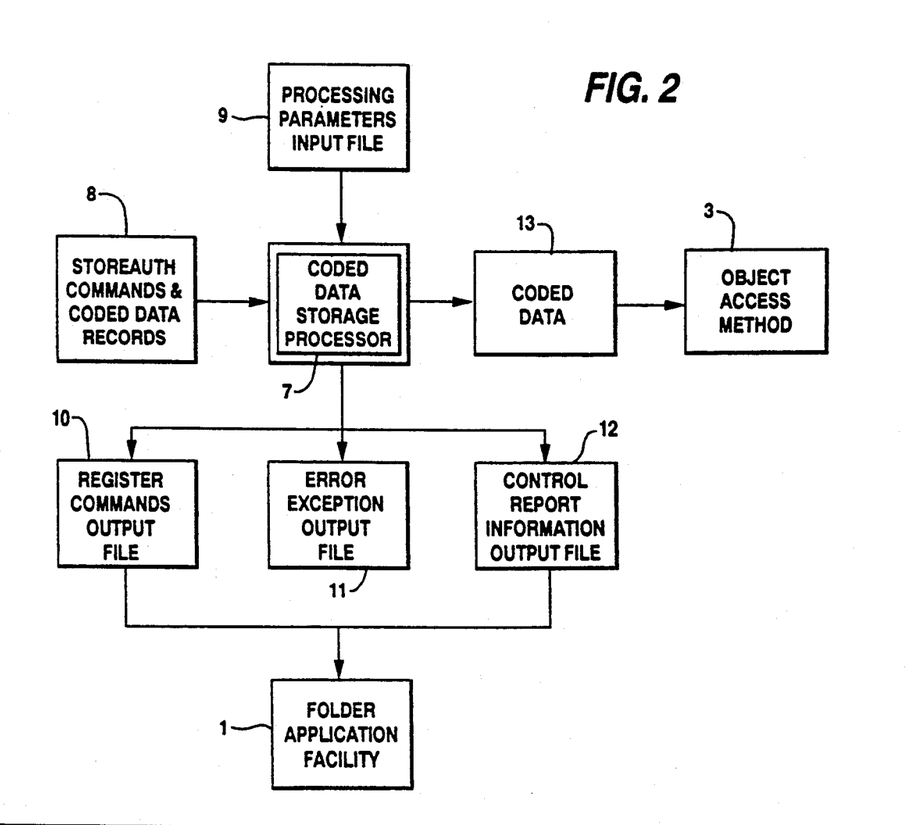
FIG. 2 is a more detailed functional block diagram of a coded data storage processor input and output flow, in accordance with the invention.

The Coded Data Storage Processor (7) is a software component written in COBOL II that is executed as a CICS (Customer Information Control System) application program under MVS/ESA. The input/output flow of this component is depicted in FIGS. 1 and 2.

1. Reads a processing parameters input file (9) to determine the start or restart coded data storage run-time environment.
2. Reads an external file (8) of storage authorization commands and coded data records that is generated by the Coded Data Intelligent Printer Image Utility (14) to be stored within the IBM Image System MVS/ESA.
3. Calls the Object Access Method (3) to physically store the coded data records (13) on DASD (5) and Optical Disk (6).
4. Writes registration commands to an external file (10) to be used by the FAF (1) to complete the storage registration process.
5. Provides error reporting to an external file (11) to be used by the FAF (1) for error reconciliation in the storage registration process.
6. Provides report information on an external file (12) to be used for management visibility of the coded data storage process.

Features of this invention are:
1. Allows storage of up to 15 million byte record length coded data records without regard to internal data architectural format.
2. Runs in a separate CICS processing region from the Image System MVS/ESA to avoid interference with that system's processing region resources.
3. Processes coded data records represented in a presentation text data architecture format (non-image) but is not restrictive to that architecture.
4. Provides simple restart logic to be used during error recovery processes.

In summary, the Coded Data Storage Processor (7) (CDSP) is a software component that facilitates storage of non-image records (coded data) (13) onto the same storage devices (5,6) used in the Image System MVS/ESA for image storage. Furthermore, the coded data format structure supported is such that the records may be fully utilized within the Image System MVS/ESA as representing documents (records) to be retrieved, displayed and printed, in a like manner to image documents. Furthermore, its support to the FAF component (1) of the IBM Image System MVS/ESA allows the system's coded data records and image records to be logically related in an individual folder entity, with the Image System MVS/ESA providing access to either or both types of records in a single, integrated folder processing transaction request and provides for the merger of coded data and image data at a workstation without operator intervention.

Figure 3:
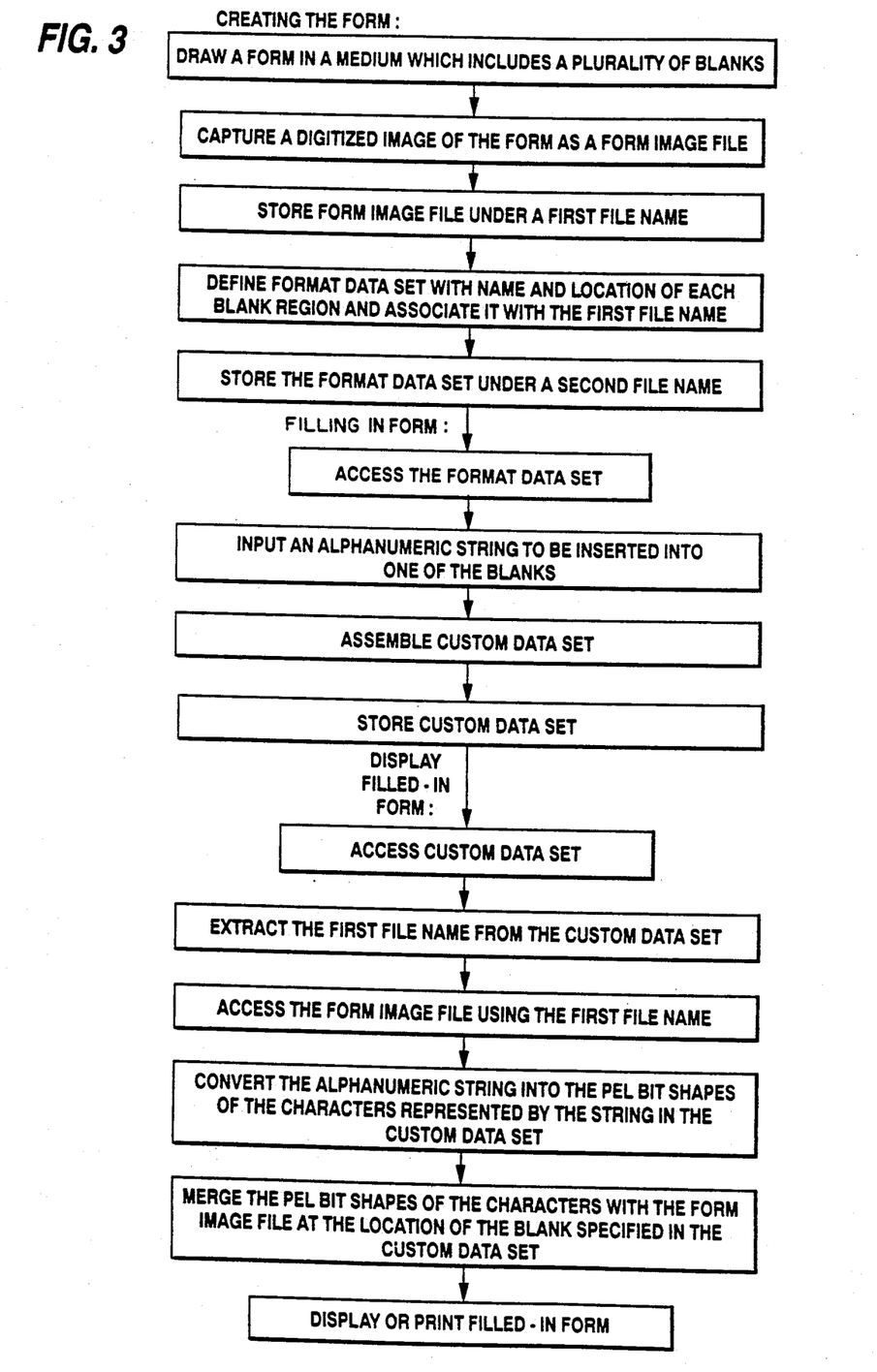
FIG. 3 is a flow diagram of the sequence of operational steps, in accordance with the invention.

FIG. 3 is a flow diagram illustrating the three major stages in accordance with the method of the invention, namely creating the form, filling in the form, and displaying the filled-in form.

Figure 4:
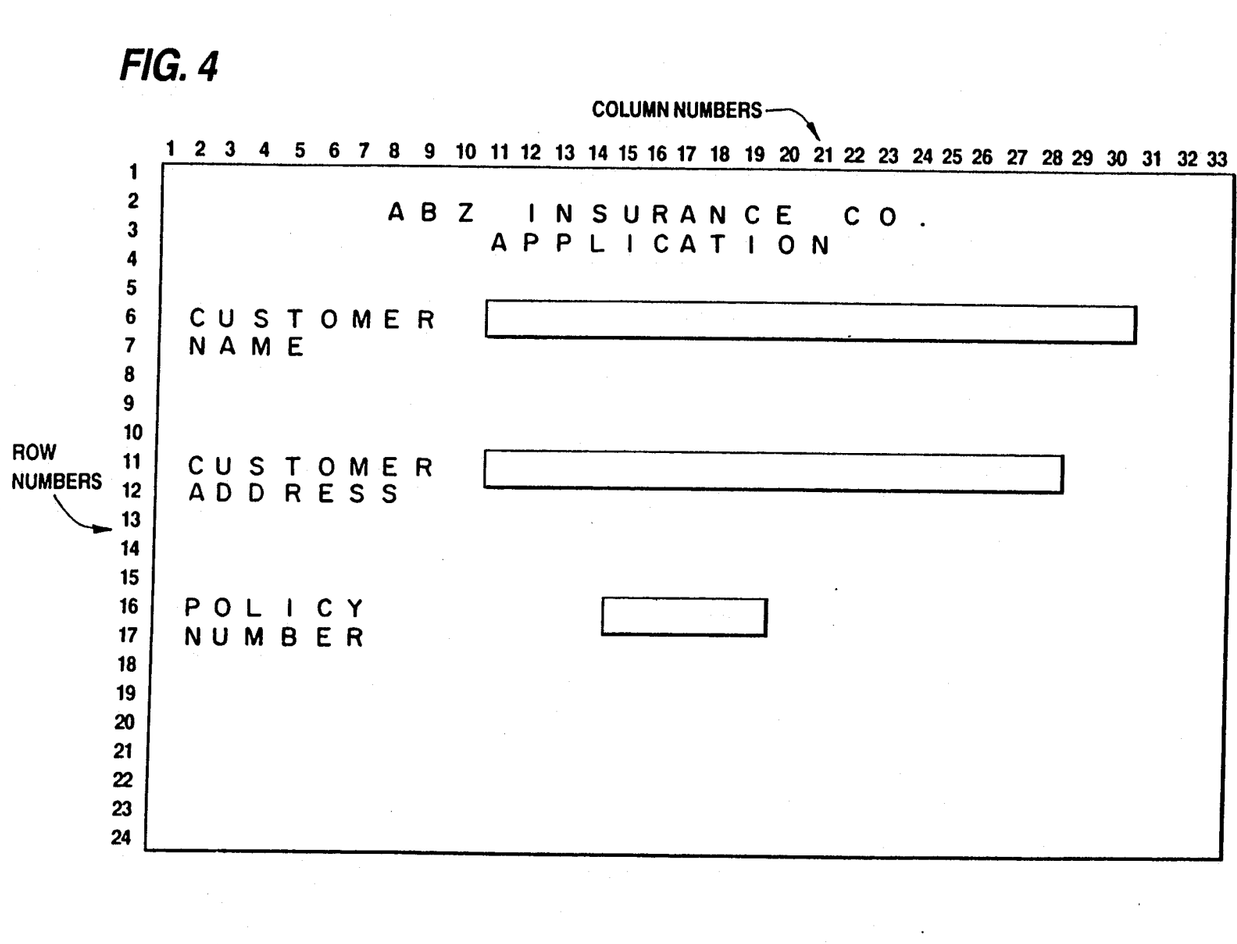
FIG. 4 depicts the image of a blank application form.
Figure 5:
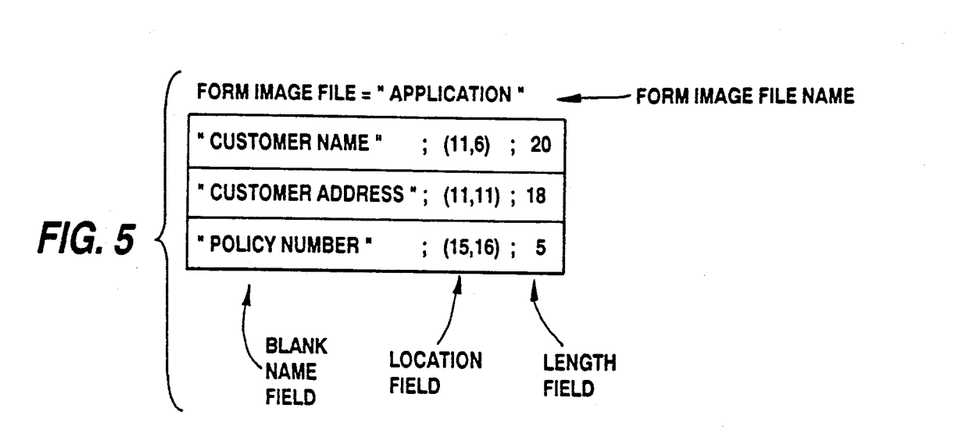
FIG. 5 illustrates the format data set.

In the flow diagram of FIG. 3, the form is created by drawing a form, which includes a plurality of blank regions, in a medium such as on a sheet of paper or on a video screen using a computer assisted design program. An example of such an image of a form is shown in FIG. 4. As can be seen in FIG. 4, the medium, in this example a sheet of paper, is divided into a plurality of columns and a plurality of rows. In FIG. 4, there are shown to be 33 columns and 24 rows. Each alphanumeric character will occupy the rectangle corresponding to the intersection of one row and one column. In the example of FIG. 4, an application form is being created for the ABZ Insurance Company. The form will have three name fields "Customer Name," "Customer Address," and "Policy Number." Corresponding to each of these three name fields there will be a blank region defined by a beginning row and column coordinate and a length, to corresponding with the initial position of the first character of an alphanumeric string and the maximum length of that alphanumeric string which will be inserted at a later time in the blank region. An example of a data set, called a format data set, which specifies the form image file name, the names of the blank fields, the field locations and the field lengths, is shown in FIG. 5, as a format data set.

In accordance with the flow diagram of FIG. 3, after the form of FIG. 4 has been drawn, its digitized image is captured as a form image file in an Image System such as that described in the Parks, et al. patent applications cited above. The form image file is then stored under a first file name, such as "Application," in the Image System bulk storage. As a part of the process of creating the form, the format data set of FIG. 5 is created by specifying the form image file name, "Application," and by specifying the name of each respective blank region in the form. For each blank region specified in the form, the name of the field, the location of the field and its length are also included in the format data set, as is shown in FIG. 5. Then, in accordance with the flow diagram of FIG. 3, the format data set is stored under a second file name in the Image System. Alternately, the format data set can be stored in a separate storage device since the relationship between the format data set of FIG. 5 and its corresponding form image file of FIG. 4 is established by including the form image file name "Application" in the format data set. One could, for example, maintain the format data set on a diskette which is stored outside of the Image System. At this point, the form has been created and has been stored for future use.

Figure 6:
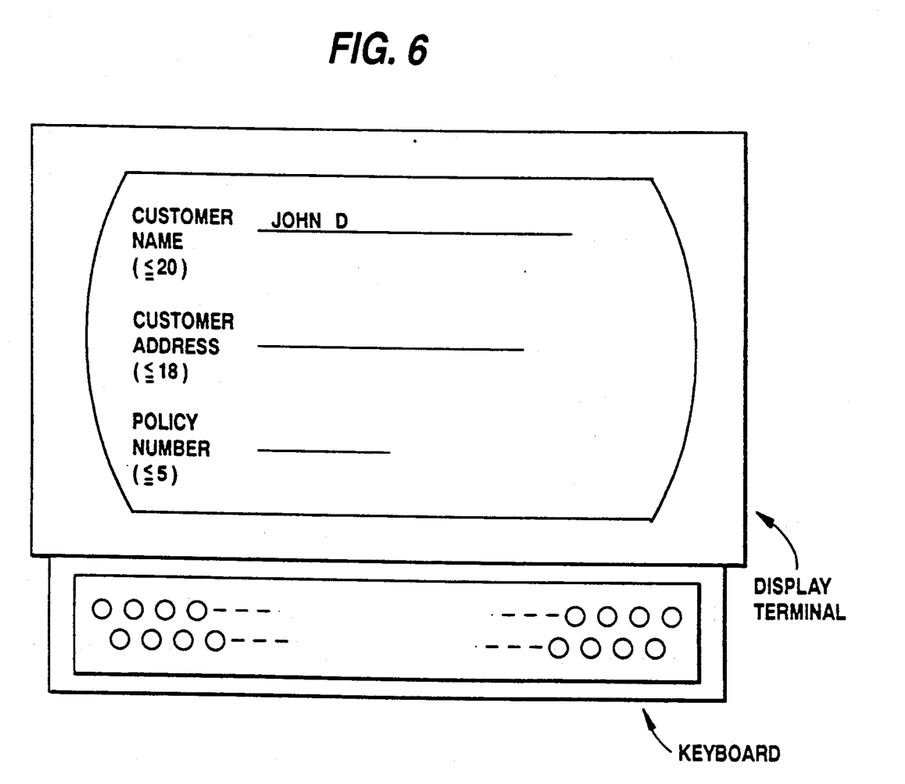
FIG. 6 depicts the custom data entry at a terminal.

Further in accordance with the flow diagram of FIG. 3, at a later time a copy of the form is desired to be filled in with customized data, for example when a customer of the ABZ Insurance Company wishes to make application by telephone and an employee of the insurance company takes steps to fill in the blanks of an application form at a workstation connected to the Image System. In accordance with the flow diagram of FIG. 3, the operator at the workstation first accesses the format data set of FIG. 5, which contains the information shown in FIG. 5. The terminal at the workstation then operates with the information stored in the format data set of FIG. 5 to display the information necessary for custom data entry, as is shown in FIG. 6. FIG. 6 illustrates a terminal at the workstation where the insurance company employee, in this example, enters the name of the customer, the customer's address and the newly issued policy number. The format data set provides the string "Customer Name" which is displayed on the workstation terminal, along with the information from the length field in the format data set indicating that the customer name must not exceed 20 characters. A similar display is made for "Customer Address" and for "Policy Number" as is shown in the custom data entry display in FIG. 6.

Figure 7:
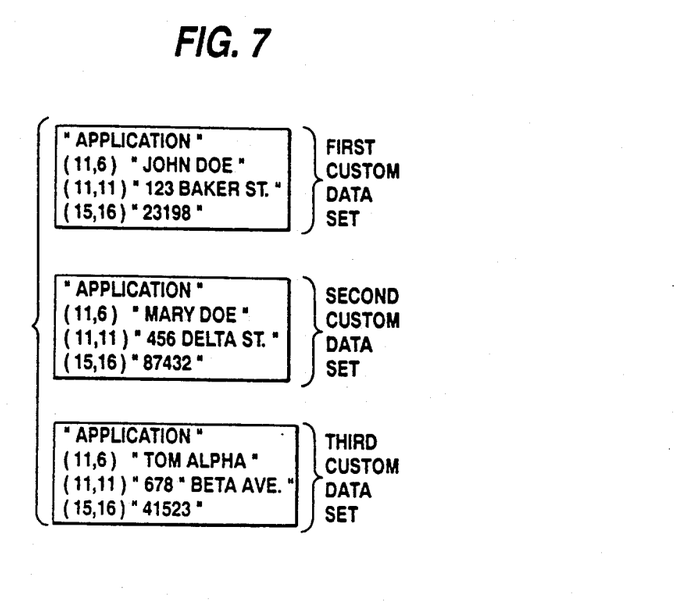
FIG. 7 illustrates the custom data sets for three data sets.

After the operator has input the alphanumeric strings which are intended to ultimately be inserted into the blanks of the form shown in FIG. 4, the custom data set corresponding to this customer's application is assembled, as is shown in FIG. 7. FIG. 7 shows a first custom data set which is constructed by extracting from the format data set the form image file name "Application" and by associating with that form image file name, the character strings corresponding to the "Customer Name," the "Customer Address," and the "Policy Number" as specified in the format data set of FIG. 5. Associated with each of these respective custom strings is the initial position for the location of each respective field as it will ultimately be placed in the image of the form shown in FIG. 4. For example, the custom string for the customer name "John Doe" has associated with it the location field (11,6) in the first custom data set of FIG. 7. The entry "(11,6)" represents the column and row position of the first character in the custom string "John Doe" which will be inserted in the blank field of the form in FIG. 4, corresponding to the "Customer Name." Then, the custom data set for the applicant "John Doe" is stored in the Image System.

Figure 8:
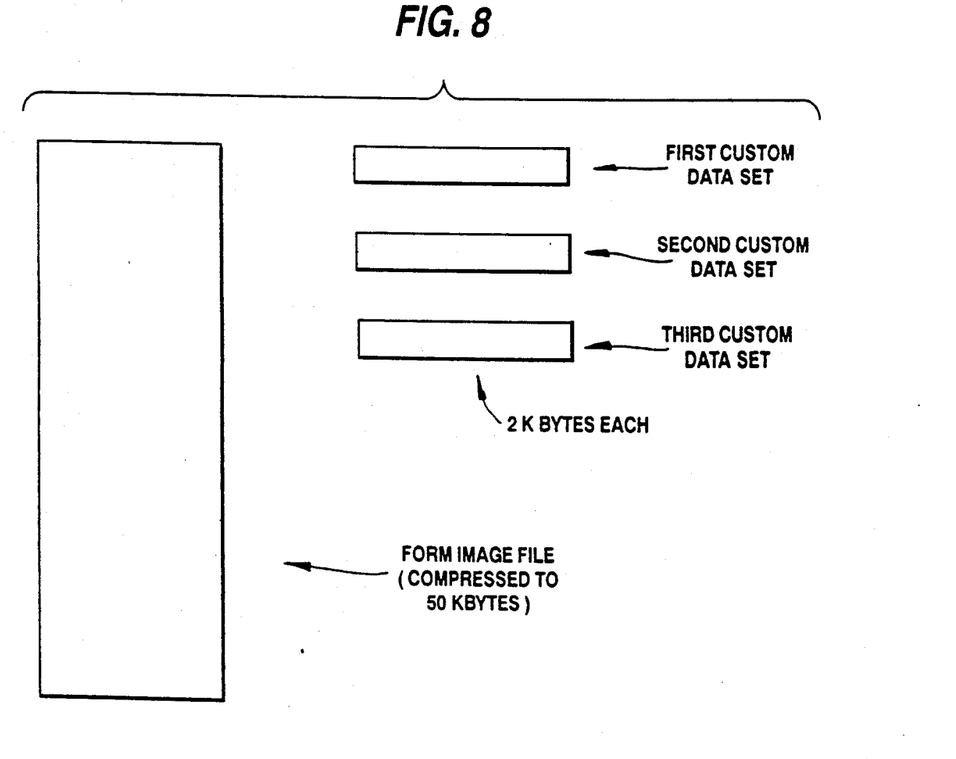
FIG. 8 illustrates the relative size of the form image file and the custom data sets.

As can be seen in FIG. 7, there are two additional custom data sets. The second custom data set for "Mary Doe" and a third custom data set for "Tom Alpha" which have also been created by the operator on the custom data entry terminal in FIG. 6. All three of these custom data sets are stored in the Image System, along with the form image file named "Application." A particular advantage for the invention is illustrated in FIG. 8, in that the size of the form image file, after it is compressed, can be typically 50K bytes. If one were to store the filled-in form for each of the insurance applicants "John Doe," "Mary Doe," and "Tom Alpha," this would aggregate to a total of 150K bytes of necessary storage in the Image System. In accordance with the invention, only a single form image file of 50K bytes is stored in the Image System corresponding to the file name "Application." Then, three different custom data sets are stored in the Image System, each requiring approximately 2K bytes of storage, as is illustrated in FIG. 8. In this manner, approximately 56K bytes of storage are required for three different applicants. This is a significant advantage which is brought about by the invention.

At a later time, it may be desired to display or to print a filled-in form for anyone of the applicants represented by the three custom data sets of FIG. 7. This is achieved in accordance with the flow diagram of FIG. 3 by accessing a custom data set corresponding to a particular applicant. For example, consider that the applicant John Doe has telephoned the insurance company and wishes to discuss his account. The employee at the insurance company will access the custom data set for John Doe. Then, the first file name "Application" will be extracted from the first custom data set. Then, the form image file named "Application" will be accessed. As has been described in the Parks, et al. patent applications cited above, the image for the blank form as shown in FIG. 4, will be decompressed and will be loaded into the display buffer at the workstation.

Figure 9:
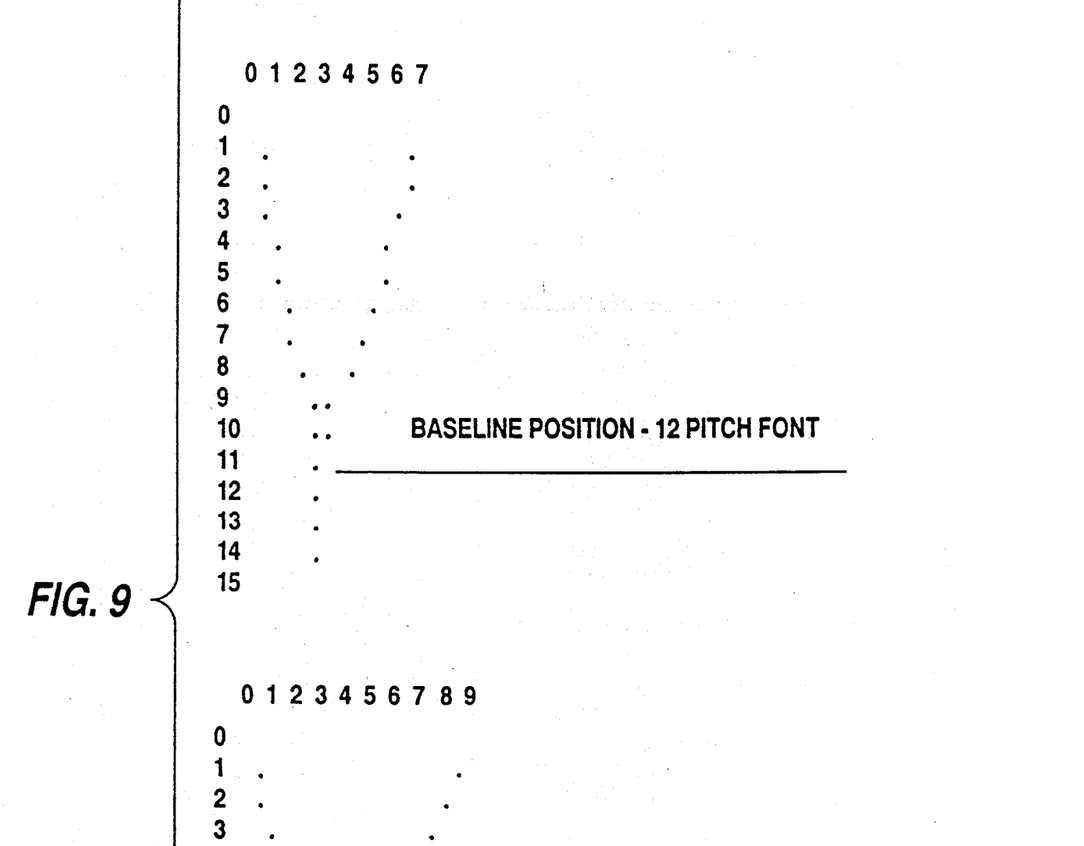
FIG. 9 illustrates character placement and in particular illustrates base line positioning for pel bit images of alphanumeric characters when merged with the form image file.

Now, in accordance with the invention, the alphanumeric character strings in the first custom data set for "John Doe" and the address "123 Baker Street" and for the policy number "23198" will be converted into the pel bit shapes of the corresponding characters represented by the string in the custom data set. Reference to FIG. 9 should be made as an illustration of this conversion. The intersection of each row and column in the depiction of the form image shown in FIG. 4 constitutes a rectangular array of bit pels. This area will be called a character position. Each character position will be made up of a rectangular arrangement of pels. For a 12 pitch font, there are eight pels in the horizontal direction and 16 pels in the vertical direction, and this is illustrated in FIG. 9. For a 10 pitch font there are 10 pels in the horizontal direction and 16 pels in the vertical direction. The conversion process from an ASCII representation of a character such as the "A," to its pel bit shape is performed by a character generation process well-known to the art, wherein the pel bit shape for the character is stored in a read only memory and the two dimensional arrangement of the pels is scanned out when that corresponding ASCII character is used to address the read only memory. When arranged in a two dimensional rectangle such as a 12 pitch eight by 16 rectangle, the shape of the "A" can be depicted. An example of such character generation can be found in the U.S. Pat. No. 4,408,200 by D. J. Bradley, "Apparatus and Method for Reading and Writing Text Characters in a Graphics Display," assigned to IBM Corporation and incorporated herein by reference.

Figure 10:
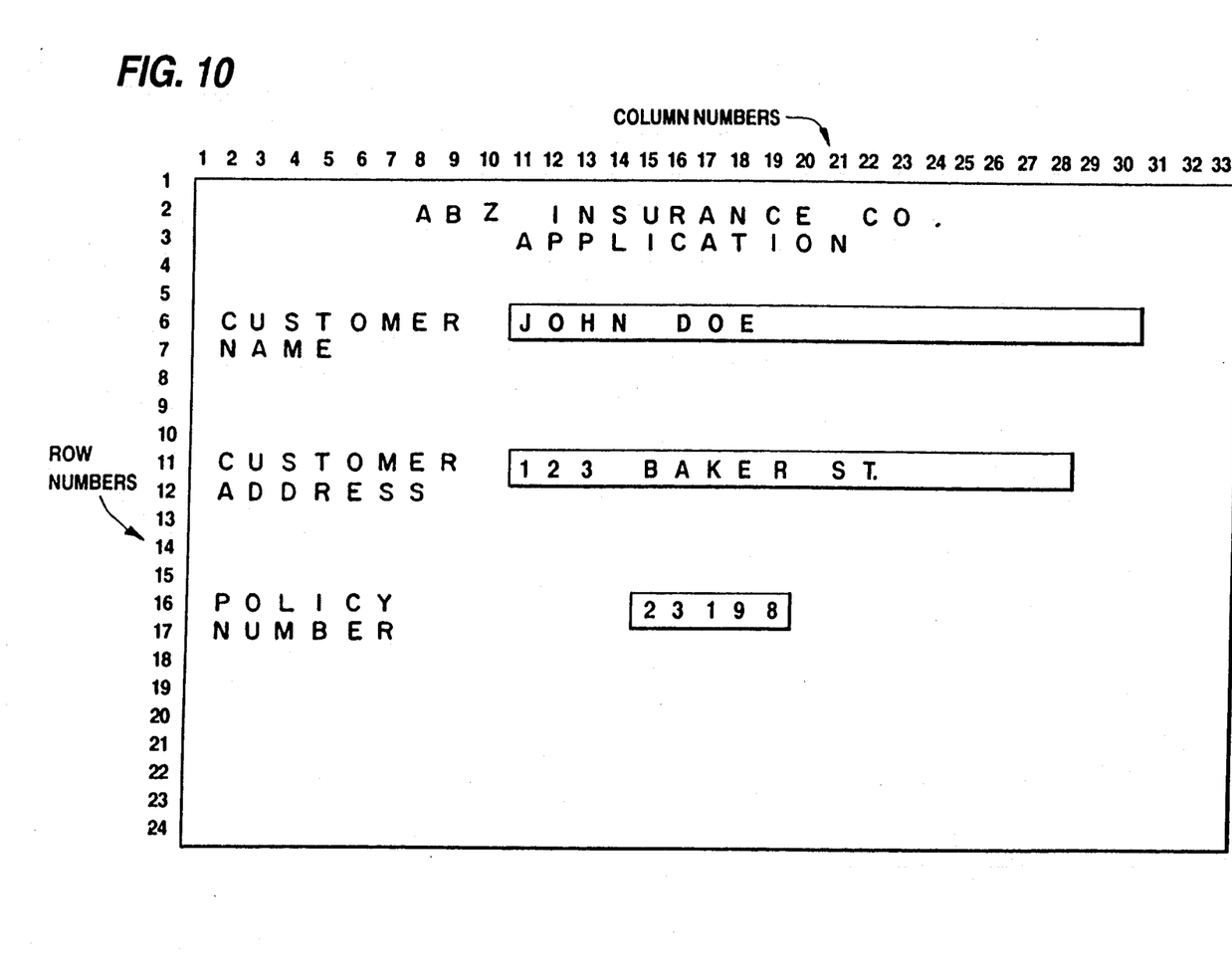
FIG. 10 illustrates the image of a filled-in application form.

The form image file named "Application" is loaded into the display buffer of an all points addressable display so that the image of the blank application form seen in FIG. 4 is represented in an all points addressable mode, for example with an image buffer that can display an 850 by 1100 pel representation. As an example, each of the fixed characters in the image of the blank application form of FIG. 4, for example the name of the insurance company "ABZ" each character will be depicted in an all points addressable mode. For example the "A" at column 8, row 2 will be depicted in a 12 pitch font in an all points addressable character rectangle having eight horizontal pels and 16 vertical pels for the area of the rectangle. The character positions in the blank areas of the image form of FIG. 4 are generally blank, the pels within each respective character position representing white space, not black space. The alphanumeric character string extracted from the first custom data set such as "John Doe" has each of its respective characters converted to a corresponding pel bit shape as described above. For example, the "J" of "John Doe" is rendered into a pel bit shape and that pel bit shape is then logically ORed with the pels in the character position corresponding to column 11, row 6, followed by the logically ORing of the rest of the alphanumeric character string for "John Doe" into the blank corresponding to "Customer Name" in the image of the blank application form of FIG. 4. Similarly, the address field "123 Baker Street" is inserted at (11,11) and the policy number "23198" is inserted at (15,16) for the blanks on the blank application form in FIG. 4. This results in the image of the filled-in application form shown in FIG. 10. This image is displayed on the workstation display and can optionally be printed on an associated printer.

DETAILED DESCRIPTION OF HOW CDSP WORKS IN SYSTEM

The customer writes a utility program to create the coded data in the data format Presentation Text Object Content Architecture (PTOCA). This data format consists of control sequences that allow selection of a font and allow precise placement of text on a display or printer. PTOCA contains provision for a presentation text data descriptor. This is a separate field that would precede the data for each record. Its purpose is to allow specification of such things as units of measure, maximum sizes and the selection of various options. In accordance with the invention, the presentation of text data would require a descriptor. The coded data items are placed on an external medium (tape, for example) in a format of tape control records followed by one or more sets of storage authorization commands and the corresponding coded data. For those coded data utilizing image overlays, an indicator is placed in each coded data header record containing the name of the form.

In a separate process, the customer scans the image overlays and creates an object record for each using the same name used in the coded data header, thus "connecting" the coded data to the overlay image form.

The tape is input to the image in a batch process where the coded data storage processor reads the records on the tapes and issues storage requests to the object storage manager through the API created for object storage. The coded data storage processor creates a return record containing a register command (successful storage indicator) for each successful coded data object that is stored by the object storage manager. When all coded data objects have been stored, the tape is returned to the customer Folder Application Facility (FAF) where a document index for each coded data object is then updated to indicate successful storage. Folder Application Facility (FAF) and Object Distribution Manager (ODM) were described in the Parks, et al. patent applications referenced above. The coded data objects are now available for processing in the customer application system.

When a request is made by the FAF to display a coded data object that uses an image overlay, the image system (ODM) requests a retrieval of both the coded data object and any associated image overlays (it knows this by looking at the coded data header) from the object storage manager. Both the coded data object and the image overlay are sent to the image workstation.

The image workstation software determines that the coded data and the image overlay go together (again by looking at the coded data header) and merges the two on the workstation display plane.

Coded Data Storage Processor Design

Coded Data Storage Component Design - Functionality Overview

The Coded Data Storage component (CDS) performs the following functions:
1. Reads the CDS processing parameters from an external input file.
2. Reads store commands with Coded Data objects from an external input file.
3. Stores the requested objects in the Object Access Method (OAM).
4. Writes register commands to an external output file for all processed objects.
5. Writes invalid store commands with Coded Data objects to an exception output file.
6. Reports on its processing activities (i.e., control, timing and processing statistics).

CDS performs the above functions using a sequential processing parameters file and an input commands file, an output register file for recording the result of each store request, and an output exception file containing the invalid store commands with the Coded Data. The CDS input/output flow is shown in FIG. 2.

Design Constraints and Assumptions

The following are the constraints and assumptions made for the design of this component:

Coded Data are received via an external file (i.e., a CICS extra partition transient file). The attributes of the files are: sequential, variable records. Each Coded Data record contains the required store command followed by the Coded Data object. The program does not assume a specific order. The design does not assume an input/output media (i.e., a tape or a disk). However, it is recommended that tapes be used for this component. Coded data are not received from FAF in online transactions. The CDS transaction will supply the extra partition input processing parameters queue name. The format of the CDS processing parameters are described in the section entitled "Extra Component Data Areas." The Coded Data input file contains two types of records: a user control record and a CDS record containing a store command and the Coded Data object. The format of each record is described in the section entitled "Extra Component Data Areas."

The register output file contains two types of records: the user control record from the input file and the Coded Data register command. The formats are described in the section entitled "Extra Component Data Areas." This file is read by FAF at a later time. The output exception file will contain the input Coded Data store command record in error, with the return and reason codes updated, and the command name changed to identify it. This exception file could be analyzed and resubmitted as input to the next CDS run. Note: input control records will not be written to this exception file. CDS supports objects types "C" (coded data) and "D" (overlay data). Coded Data are received via the external input file, and are in EBCDIC format. Coded Data Overlay forms are scanned through the workstations. Coded Data arrive in an IBM defined architectural format compatible with other objects stored in OAM. No envelope or document manipulation is performed. The processing of a Coded Data file is suitable for a batch environment. However, the OAM Interface is only available through CICS. Therefore, this design assumes an implementation of CICS application reading and writing from/to extra partition transient files. Extra partition files are non-recoverable CICS resources and therefore, simple restart logic is included in the PDL. Backup is not required for Coded Data. It is done automatically by OAM. In a distributed environment, it is assumed that each ODM receives only its own Coded Data. This requires that the utility creating the input file assigns the data owning ODM as the proper destination for the file. The application program is designed to process the Coded Data records in sequence. Parallel execution is possible.

Operational Considerations

The CDS component is designed to run as a CICS application program. It is recommended that a separate CICS region be defined for the processing of Coded Data for the following reasons:
1. If the input or output file is a tape, the possibility for causing waits in the main ODM region is eliminated.
2. A separate CICS region can be started at a selected time as a batch job or a started task without interfering with the rest of the system. This can be done when the external file is available.
3. The DCT entries defining the extra partition files can be coded with the file open initial mode making it immediately available to the application program.

A separate CICS region can be started with minimal operator intervention. This can be accomplished by defining a batch terminal. The terminal input is read from a JCL DD card. The specified input causes the transaction to start and pass parameters to the program. The region may also be automatically terminated at the end of processing.

Component Interfaces

The Coded Data Storage Processor (CDS) interfaces with the following components: OAM Interface - CDS with the OAM interface to store objects in OAM managed storage.

Performance Criteria

The CDS process is streamlined to process single record objects at the maximum speed. Objects that are multiple records, will incur additional overhead.

Memory Space Allocation

The OAM Component requires a buffer for each object that needs to be stored. The size of the buffer must equal the object size plus additional control information. This buffer description will be part of the CDS input record. One GETMAIN, at the program initialization for 32K, will be done to place the input record. When storing multiple record objects, a 32K buffer will be allocated for each record. All the records needed to build the object will be read into these buffers before the object is stored. Since the object size of Coded Data is very small (relative to the images), memory space is not of major concern for this component.

Module Definitions

The CDS component runs as an application program in a CICS region. It is composed of one module: Process Coded Data (OMDDSTOR).

OMDDSTOR Process Coded Data

---

*************START OF SPECIFICATION*************

-continued

MODULE-NAME: OMDDSTOR
DESCRIPTIVE-NAME: Process Coded Data
COPYRIGHT: IBM Corporation
STATUS: Version 1 Release 1
FUNCTION: Stores Coded Data received from an external input file.
OPERATION:
1. Receive the input parameter queue name.
2. Read control parameter.
3. Read a Coded Data item from the external input file.
4. Request the OAM Interface to store the object.
5. Write a register confirmation to an external output file.
6. Produce a control report with processing statistics.
RECOVERY OPERATION:

This program uses extra partition files which are not recoverable CICS resources. The program indicates within the register command when a CICS SYNCPOINT was issued. When the program starts, a check is made for a restart parameter, and an object name to restart after, from the input control record. Records prior to that object name are read but not processed. When a match on object name is made, normal processing resumes on the next record.
DEPENDENCIES: Availability of Coded Data file.
MODULE TYPE: Program.
PROCESSOR: COBOL II
ATTRIBUTES: AMODE(31) RMODE(ANY)DATA(31).
RETURN CODES: None.
EXIT-NORMAL: Returns to CICS.
EXIT-ERROR:

Clean up resources (buffers, rollback to a previous syncpoint) and terminate processing.
FILES/QUEUES-USED:
1. Input Processing Parameters file (extra partition)   -INPUT.
2. Input Transaction file (extra partition)   -INPUT.
3. Register output file (extra partition)   -OUTPUT.
4. CDS Exception file (extra partition)   -OUTPUT.
5. CDS Control Report (extra partition)   -OUTPUT.
MESSAGES: TBD.
ABEND-CODES: None.
CHANGE ACTIVITY: Initial release.
*************END OF SPECIFICATION**************

Extra Component Data Areas - Coded Data Input File Formats

The Coded Data input file contains two types of records:

| Field Name | Description |
| --- | --- |
| 1. Control Record | |
| record-type | An indicator of a control record type ("CNTL"). |
| control-data | User defined control record data. |

Note: Control record data is user defined. The Control Record(s) is written to the Register Record file. The first 80 bytes of the Control Record(s) is written to the Control Report.
2. Coded Data Store Record

| Field Name | Description |
| --- | --- |
| command-code | An indicator of a store record type ("STRC"). Store record from exception file ("STRE"). |
| ssysid | (not used). |
| tsysid | (not used). |
| osysid | (not used). |
| segment-number | Object segment number. |
| number-of-segments | Total number of segments for the object. |
| object-size | Total object size (in bytes). |
| numpages | Total pages in object. |
| copy-code | Copy code = Y, stores a copy. |
| tempid | Temporary ID (TEMPID). |
| object-name | CDS object name. |
| object-type | Object type code. |
| storage-class | OSM storage class (optional). |
| management-class | OSM management class (optional). |
| retention-period | OSM retention period (optional). |
| return-code | Return Code - STRE command only. |
| reason-code | Reason Code - STRE command only. OSM's buffer segment description. |
| segment-length | Segment length (object data + 8 in bytes). |
| used-length | Object-Data size (length of object-data in bytes). |
| object-data | Coded Data object data. |

Register Output File Formats

The Register output file contains two types of records:

| Field Name | Description |
| --- | --- |
| 1. Control Record | |
| record-type | An indicator of a control record type ("CNTL"). |
| record-data | The identical record read from the Coded Data input file. |
| 2. Register Record | |
| record-type | An indicator of a control record type ("REGC"). |
| ssysid | (not used). |
| tsysid | (not used). |
| osysid | (not used). |
| numpages | Total pages in object. |
| object-name | CDS object name. |
| object-type | Object type code. |
| tempid | TEMPID. |
| return-code | Return Code. |
| reason-code | Reason Code. |
| copy-code | Copy code = Y, stores a copy. |
| syncpoint-flag | Y = syncpoint occurred after this record. |

CDS Transaction Parameters File Format

The CDS Transaction Parameters are contained in an 80 byte sequential, on keyword per record, file.

| Field Name | Value | Col | Req | Description |
| --- | --- | --- | --- | --- |
| 1. Comment Record: (not required) | | | | |
| KEYWORD | '*' | 1 | Y | Comment. an asterisk in column 1 can be used to denote a comment line. |
| Filler | | 2-80 | n | Comment |
| 2. Syncpoint Interval Record: (required) | | | | |
| KEYWORD | 'SYNCINTR=' | 1-9 | Y | Syncpoint Interval Keyword |
| SYNCINTR | 1-9999 | 10-14 | Y | The number of records to be processed before a syncpoint is taken. |
| Filler | | 14-80 | n | Comment |

-continued

| Field Name | Value | Col | Req | Description |
|---|---|---|---|---|
| 3. Error Threshold Record: (required) | | | | |
| KEYWORD | 'ERRTHRES=' | 1-9 | Y | Error Threshold Keyword |
| ERRTHRES | 1-9999 | 10-14 | Y | The no. of non-system record errors before processing should terminate. |
| Filler | | 14-80 | | Comment |
| 4. CDS Input Queue Record: (required) | | | | |
| KEYWORD | 'INCDATAQ=' | 1-9 | Y | CDS Input Queue Keyword |
| INCDATAQ | (queue name) | 10-17 | Y | Input extra partition queue name. |
| Filler | | 18-80 | n | Comment |
| 5. CDS Register Queue Record: | | | | |
| KEYWORD | 'OUTREGIQ=' | 1-9 | Y | CDS Register Queue Keyword |
| OUTREGIQ | (queue name) | 10-17 | Y | Output Register extra partition queue name. |
| Filler | | 18-80 | n | Comment |
| 6. CDS Exception Queue Record: (required) | | | | |
| KEYWORD | 'OUTEXCPQ=' | 1-9 | Y | CDS Exception Queue Keyword |
| OUTEXCPQ | (queue name) | 10-17 | Y | Output Exception extra partition queue name. |
| Filler | | 18-80 | n | Comment |
| 7. CDS Report Queue Record: (required) | | | | |
| KEYWORD | 'OUTRPRTQ=' | 1-9 | Y | CDS Report Queue Keyword |
| OUTRPRTQ | (queue name) | 10-17 | Y | Output Report extra partition queue name. |
| Filler | | 18-80 | n | Comment |
| 8. Restart Flag Record: (not required) | | | | |
| KEYWORD | 'RSTRTFLG=' | 1-9 | Y | Restart Flag Keyword |
| RSTRTFLG | 'Y', 'N' | 10 | n | Y = CDS processing is being restarted. Note: Default is N. |
| Filler | | 11-80 | n | Comment |
| 9. Restart Object Name Record: (not required see note *) | | | | |
| KEYWORD | 'ROBJNAME=' | 1-9 | Y | Restart Object Name Keyword |
| ROBJNAME | (object name) | 10-49 | * | Name of object to restart after. |
| Filler | | 18-80 | n | Comment |

*Note: A Restart Object Name Record is required, with ROBJNAME coded if Restart Flag Record is coded with RSTRTFLG=Y.

Control Report Output Report Format

CDS PROCESSING CONTROL REPORT

```
RUN DATE - 99-99-99
RUN TIME - 99:99:99
SECTION 1: PROCESSING PARAMETERS
SYNCPOINT INTERVAL    = 9999
ERROR THRESHOLD       = 9999
CDS INPUT QUEUE       = XXXXXXXX
CDS OUTPUT QUEUE      = XXXXXXXX
CDS EXCEPTION QUEUE   = XXXXXXXX
CDS REPORT QUEUE      = XXXXXXXX
RESTART FLAG          = X
RESTART OBJECT NAME   = XXXXXXXXXXXXXXXXXXXXXXXXXXXXXXXX
SECTION 2: ERROR REPORT
CONTROL RECORD:
XXXXXXXXXXXXXXXXXXXXXXXXXXXXXXXXXXXXXXXXXXXXXXXXXXXXXXXX
ERROR:  XXXXXXXXXXXXXXXXXXXXXXXXXXXXXXXXXXXXXXXXXXXXXXXXXX
        XXXXXXXXXXXXXXXXXXXXXXXXXXXXXXXXXXXXXXXXXXXXXXXXXX
ERROR:  XXXXXXXXXXXXXXXXXXXXXXXXXXXXXXXXXXXXXXXXXXXXXXXXXX
SECTION 3: CDS PROCESSING STATISTICS
CDS PROCESSING COMPLETE - RETURN CODE 9999       REASON CODE 9999
INPUT    RECORDS READ              - 9,999,999
         CONTROL RECORDS READ                    - 9,999,999
         CODED DATA STORE STRC RECORDS READ      - 9,999,999
         CODED DATA STORE STRE RECORDS READ      - 9,999,999
OBJECTS SUCCESSFULLY STORED        - 9,999,999
OBJECTS WRITTEN TO EXCEPTION       - 9,999,999
         DUPLICATE OBJECT ERRORS                 - 9,999,999
         COMMAND VALIDATION ERRORS               - 9,999,999
OUTPUT RECORDS WRITTEN             - 9,999,999
```

-continued

| CDS PROCESSING CONTROL REPORT | |
|---|---|
| CONTROL RECORDS WRITTEN | - 9,999,999 |
| REGISTER RECORDS WRITTEN | - 9,999,999 |
| TOTAL NUMBER OF BYTES STORED | - 999,999,999K |
| TOTAL NUMBER OF PAGES | - 999,999,999,999 |
| TOTAL ELAPSED TIME OSM | - hh:mm:ss |
| TOTAL ELAPSED TIME CDS | - hh:mm:ss |

The resulting method and apparatus to merge a digitized image with an alphanumeric character string provides a more efficient and automatic way of merging these two diverse types of information, than has been available in the prior art.

Although a specific embodiment of the invention has been disclosed, it will be understood by those having skill in the art that minor changes can be made to the specific embodiment without departing from the spirit and the scope of the invention.

What is claimed is:

1. In a data processing system including an image input device, an alphanumeric character input device, a data storage and a display device, a method for storing and retrieving a digitized image of a document having fixed and variable fields, comprising the steps of:

inputting to said data processing system, a bit-mapped image of a document which includes a first variable field for first type information;

compressing said bit-mapped image in said system and storing the compressed image in said system, accessible using an image file name;

inputting first field location information to said system, identifying a location of said first variable field in said bit-mapped image;

inputting to said system a first alphanumeric character string expressing the first type information;

assembling in said system a first data set including said first character string, said image file name, and said first field location information and storing the first data set in said system, accessible using a first object file name;

inputting to said system a second alphanumeric character string expressing the first type information;

assembling in said system a second data set including said second character string, said image file name, and said first field location information and storing the second data set in said system, accessible using a second object file name;

selectively initiating the display of the document with the second character string in said first field by inputting to said system said second object file name to access said second data set;

extracting in said system said image file name from said second data set;

accessing in said system said compressed image using said image file name;

decompressing said compressed image and storing said bit-mapped image in an image buffer in said system;

extracting in said system said second alphanumeric character string from said second data set;

converting in said system said second alphanumeric character string to corresponding pel bit shapes of the characters in the second string;

extracting in said system said first field location information from said second data set;

merging in said system said pel bit shapes with said bit-mapped image in the image buffer, at said first field location, forming a merged image;

displaying said merged image from said image buffer on said display device in said system.

2. The method of claim 1, which further comprises:

said document includes a second variable field for second type alphanumeric character string information at a location therein identified by second field location information;

said data sets include a second type character string and said second field location information;

after said step of decompressing, extracting said second type character string from said second data set;

converting said second type character string to second corresponding pel bit shapes of the characters in said second type string;

extracting said second field location information from said second data set;

merging said second pel bit shapes with said bit-mapped image in the image buffer, at said second field location, forming said merged image.

3. The method of claim 1, wherein said step of displaying includes the step of printing a copy of said merged image.

4. The method of claim 1, wherein said step of merging is by logically ANDing said pel bit shapes with said bit-mapped image.

5. The method of claim 1, wherein said step of merging is by logically ORing said pel bit shapes with said bit-mapped image.

6. The method of claim 1, wherein said step of merging is by exclusively ORing said pel bit shapes with said bit-mapped image.

7. In a data processing system, an apparatus for storing and retrieving a digitized image of a document having fixed and variable fields, comprising:

first means for inputting to said data processing system, a bit-mapped image of a document which includes a first variable field for first type information;

second means coupled to said first means, for compressing said bit-mapped image in said system and storing the compressed image in said system, accessible using an image file name;

third means for inputting first field location information to said system, identifying a location of said first variable field in said bit-mapped image;

fourth means for inputting to said system a first alphanumeric character string expressing the first type information;

fifth means coupled to said third and fourth means, for assembling in said system a first data set including said first character string, said image file name, and said first field location information and storing the first data set in said system, accessible using a first object file name;

said fourth means inputting to said system a second alphanumeric character string expressing the first type information;

said fifth means assembling in said system a second data set including said second character string, said image file name, and said first field location information and storing the second data set in said system, accessible using a second object file means;

sixth means for selectively initiating the display of the document with the second character string in said first field by inputting to said system said second object file name to access said second data set;

seventh means coupled to said sixth means, for extracting in said system said image file name from said second data set;

eighth means coupled to said seventh means, for accessing in said system said compressed image using said image file name;

ninth means coupled to said eighth means, for decompressing said compressed image and storing said bit-mapped image in an image buffer in said system;

said seventh means extracting in said system said second alphanumeric character string from said second data set;

tenth means coupled to said seventh means, for converting in said system said second alphanumeric character string to corresponding pel bit shapes of the characters in the second string;

said seventh means extracting in said system said first field location information from said second data set;

eleventh means coupled to said ninth and tenth means, for merging in said system said pel bit shapes with said bit-mapped image in the image buffer, at said first field location, forming a merged image;

twelfth means coupled to said eleventh means, for displaying said merged image from said image buffer on a display device in said system.

8. The apparatus of claim 7, wherein said twelfth means includes a printer.

* * * * *